3,478,279
OPTICAL MASER
Haruhiro Kobayashi and Taizo Oikado, Minato-ku, Tokyo, Japan, assignors to Nippon Electric Company, Limited, Tokyo, Japan, a corporation of Japan
Filed Apr. 13, 1964, Ser. No. 359,374
Claims priority, application Japan, Apr. 26, 1963, 38/21,835
Int. Cl. H01s 3/22
U.S. Cl. 331—94.5                              11 Claims

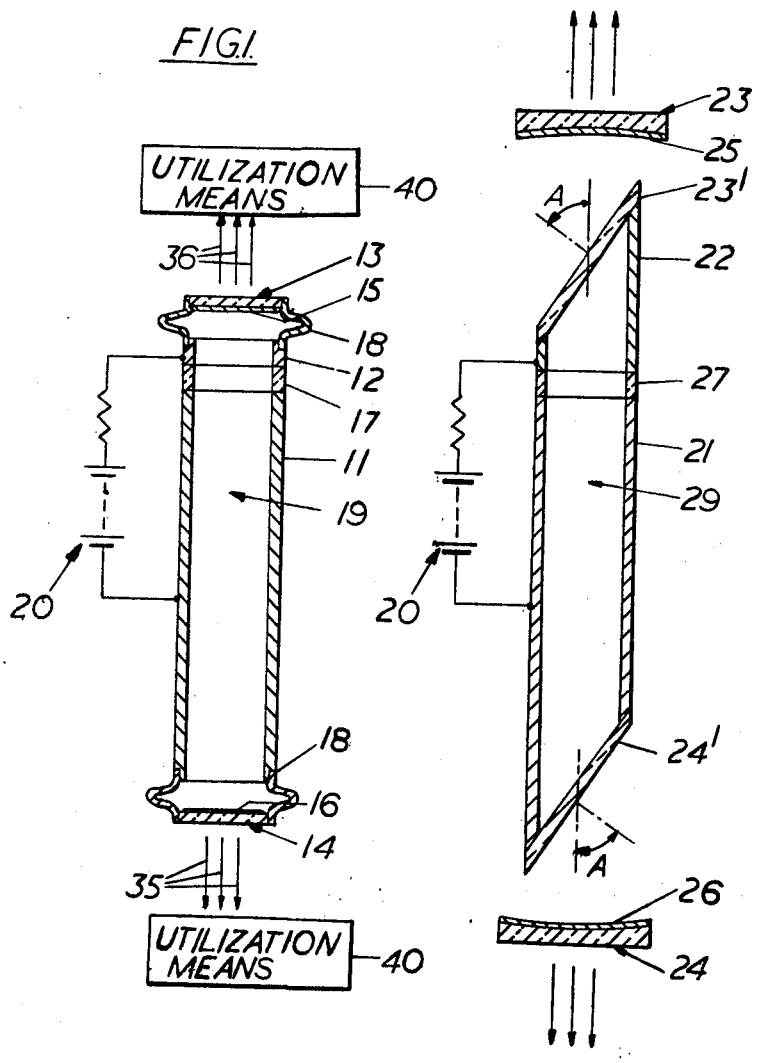

ABSTRACT OF THE DISCLOSURE

A hollow type glow discharge optical maser having cylindrical-shaped anode and cathode electrodes arranged in coaxial fashion. The electrodes are spaced from one another along their common longitudinal axis and are coupled to an energy source to provide a potential difference therebetween. The internal surfaces of the tubular electrodes are exposed to a gas provided therein. The electrical potential activates the gases to provide a hollow type glow discharge which is reflected by suitable reflector means to generate an intense glow. The hollow-type cathode discharge causes intense cathode sputtering of the cathode electrode which, in turn, causes the vapour of the sputtered metal to be as strong as or stronger than the discharge through the gas so as to greatly intensify the glow of the optical maser.

---

This invention relates to an optical maser wherein the source of stimulation is a hollow-type glow discharge.

An object of the invention is to provide an optical maser which produces a stronger light than conventional optical masers.

Another object of the invention is to provide an optical maser which produces not only light emitted by the sealed gases but also strong intensity light emitted by the metal vapor.

This invention provides an optical maser which has a tubular cathode made of a selected metal, such as copper. An annular anode, having substantially the same inside diameter as the cathode, is provided and disposed so as to be axially spaced from the cathode and coaxially aligned with the cathode. A selected gas, such as a mixture of neon and helium, is sealed within the region enclosed by the cathode and the anode. A pair of reflectors are disposed axially outside of the cathode and the anode and in intersecting relation to the common axis of the cathode and the anode, at least one of said reflectors having a small light transmittivity. The optical maser also includes means for applying the discharge voltage between the cathode and the anode. A strong light is emitted by this device because of the transition between the electron energy levels of each of the sealed-in selected gases and of the vapour of the selected cathode metal sputtered by the hollow-type glow discharge in the gas, which is caused by the hollow-type glow discharge in the gas and the metal vapour.

In conventional optical masers use is made of the discharge in a single gas or a mixed gas. One such prior art optical maser provides for electrodeless discharge of 28 megacycles which discharge is caused in a mixed helium and neon gas sealed in a quartz tube of 1.5 cm. in diameter and 80 cm. in length. This prior art device is described by A. Javan et al. in "Physical Review Letters," vol. 6 (1961), p. 106. In this device it is very difficult to raise the density of the plasma to a sufficiently high level and therefore a fairly long tube is required along with a high-powered high-frequency power source in order to give rise to strong maser oscillation. These defects are overcome by the present invention by altering the state of discharge so that it is possible to produce stronger light than ever with both a smaller discharge tube and a lower-voltage power source.

The above-mentioned and other features and objects of this invention and the means of attaining them will become more apparent and the invention itself will be best understood by reference to the following description of embodiments of the invention taken in conjunction with the accompanying drawings in which:

FIG. 1 is a logitudinal sectional view of an optical maser of the invention, and FIG. 2 is a longitudinal view of another embodiment of this invention.

Referring to FIG. 1, there is illustrated therein a first embodiment of the invention. In FIG. 1, a tubular cathode 11 is made of a selected metal such as copper. An annular anode 12 is provided which has substantially the same cross-section as the cathode 11. A pair of reflectors 13 and 14 are provided at opposite ends of the device. Each reflector has an optically parallel flat surface thereon such as reflecting surfaces 15 and 16. The surfaces 15 and 16 are multilayer dielectric films (formed on one of the parallel surfaces thereof) which have a reflecting power of about 98.9% and a transmission of about 0.3% in the wavelength range of 1.1–1.2 microns. The reflecting power is selected to abruptly decrease beyond the wavelength range so as to allow nearly perfect transmission of light. Reflectors 13 and 14 are disposed perpendicular to the common axis of the electrodes 11 and 12. A ceramic insulating ring 17 is provided to hermetically interconnect the tubular cathode 11 and the annular anode 12. Tubular metal bellows 18 are provided to hermetically interlink the tubular cathode 11 and the reflector 14 as well as the annular anode 12 and the reflector 13. A gas mixture is sealed within confined region 19 formed by the elements mentioned above. The gas, for example, may be composed of neon of about 0.1 mm. Hg and helium of about 1 mm. Hg. When a power source 20 supplying about 500 volts is connected between the tubular cathode 11 and the annular anode 12, the hollow-type glow discharges sustains itself within the tubular cathode 11 and emits a strong light. During the discharge, the light emitted by helium in the energy level $2^3S$ causes an inversion of the electron density in the neon between the energy levels $2S$ and $2P$ to produce a light having a wavelength of about 1.15 microns, which corresponds to the difference between these two energy levels. This 1.15 micron light is repeatedly reflected by the reflecting surfaces 15 and 16 which are selected to have a particularly large reflecting power at that wavelength to induce emission of light of the same wavelength from the excited neon as it passes through the region 19. About 0.3% of this light is transmitted through surfaces 15 and 16 to the utilization means 40 as the output light each time the light is reflected by said surfaces. This output light is indicated by arrows 35 and 36. The utilization means 40 receive and utilize said output light. The glow discharge employed in this invention, is several hundred times as high as conventional discharges such as disclosed in the above mentioned article by A. Javan et al. It is therefore possible with the optical maser of the invention to obtain stronger light with a discharge tube of shorter length and with a power source of lower voltage. Also, as described by Toshimitsu Musha in the "Journal of the Physical Society of Japan," vol. 17, pp. 1440–1453, it is known that hollow cathode discharge causes intense cathode sputtering so that in ordinary cases the discharge through the vapour of the sputtered metal is as strong as or stronger than the discharge through the sealed gas. It is consequently possible by selection of a suitable metal for the tubular cathode 111 to utilize the light of specific wavelength emitted by excitation of the metal vapour. For example, if copper is used as the cathode material and if reflecting surfaces 15 and 16 have large reflecting power within a wavelength range including about 1.5 microns, then it is possible to provide light having a wavelength of about 1.60 microns which is emitted by inversion of the electrons between the energy levels $5^2P_{1/2}$ and $5^2S_{1/2}$ of the copper atoms. Thus, the optical maser of this invention can have smaller dimensions and yet produce a remarkably stronger light than heretofore possible and to cause incidental optical maser oscillation in the metal vapour.

Referring to FIGURE 2, there is illustrated therein another embodiment of the invention. In FIGURE 2 a tubular cathode 21 is provided which has one end cut at a diagonal angle relative to the cathode longitudinal axis. An annular anode 22 is provided and a ceramic ring 27 interconnects these electrodes. Anode 22 has one end cut at the above mentioned diagonal angle. A power source 20 is connected to the anode and cathode. The confined region 29 contains the gas. Disposed in a manner similar to the first embodiment shown in FIGURE 1 are the pair of flat plates 23' and 24' which may be made of fused quartz. These plates are disposed parallel to each other and are slanted such that the angle formed between the normal to such a flat plate and the center axis may be equal to the Brewster's angle A (in this case about 55.4°) of polarization which satisfies a relation $$\tan A = n.$$

where $n$ is the refractive index (about 1.45 for fused quartz for light of about 1.1 microns in wavelength). A pair of reflectors 23 and 24 are provided which have reflecting surfaces 25 and 26, respectively. Said reflecting surfaces have a radius of curvature equal to the space therebetween so as to be a confocal pair of concave mirrors which repeatedly reflect the light therebetween.

For light falling incident on a transparent body at an angle of incidence equal to Brewster's angle A of polarization, the reflecting power $R_p$ is for the first linearly polarized light component whose plane of polarization lies parallel to the plane of incidence is given by:

$$R_p = \tan (A-B)/\tan (A+B) \quad (1)$$

where B is the angle of refraction corresponding to the angle of incidence A and becomes zero so that such component wholly passes through the fused quartz flat plate, while the reflecting power $R_s$ is given by:

$$R_s = -\sin (A-B)/\cos (A+B) \quad (2)$$

Equation 2 holds for the second linearly polarized component whose plane of polarization is perpendicular to the plane of incidence and is about 34° with the result that this latter component is reflected aside upon each incidence on either of the fused quartz flat plates 23' and 24' and is thus rapidly weakened. Furthermore, the second linearly polarized component of the light produced in the confined region 29 departs (while being repeatedly reflected by the concave mirrors 23 and 24) from the region in a much smaller amount than that reflected by the plain mirrors 15 and 16 shown in FIGURE 1. Therefore, the light emitted by the sealed-in neon or the sputtered copper in the light maser of FIGURE 2, is a linearly polarized light whose electric intensity lies parallel to the plane of incidence to the flat plate 23' or 24' and is even stronger than that attainable with the embodiment of FIGURE 1. It is, however, necessary to use reflectors 23 and 24 having reflecting surfaces 25 and 26, respectively, which reflectors have spectral characteristics that are suitable for the wavelength to be produced either by the gas or by the metal vapour. It is to be noted that theoretically the Brewster's angle A of polarization also depends on the wavelength but that in practice, the deviation of the Brewster's angle of polarization arising from the difference between the wavelengths may be neglected because the reflecting power of the fused quartz flat plate for light of 1.6 microns in wavelength (for which the refracting index is 1.4435 which light is incident on said plates with an angle of incidence which is equal to the Brewster's angle of polarization 55°24") as well as for light of 1.1 microns in wavelength (for which the refractive index is 1.4493) is only about 0.1% as calculated with the use of Equation 1.

In the optical maser of the invention, the metal selected for the annular anode 12 or 22 is not critical although deoxidated copper is preferred. The metal for the tubular cathode 11 or 21 may be chosen to be titanium, zirconium, hafnium, niobium, tantalum, molybdenum, tungsten, iron, nickel, or copper.

The material for the base of the reflector 13, 14, 23, or 24 may be any isotropic material which is substantially transparent for the light of the wavelength to be taken out, and may be a material such as plastic, glass or fused quartz.

In the embodiment of FIGURE 2, the flat plates 23' and 24' which are slanted so that each of their normals forms the Brewster's angle of polarization with their common axis, may be disposed perpendicular to the center axis as illustrated in FIGURE 1. It is to be noted, however, that the light obtained thereby is natural light (as is the case with the embodiment of FIGURE 1) and that the loss of light caused by the repeated reflection increases somewhat as compared with that in the unmodified embodiment shown in FIGURE 2. This will occur because about 3.4% of the reflected light falling perpendicularly incident onto one of the surfaces is reflected by the flat surface as in the embodiment of FIG. 1 and not by a concave surface.

The multi-layer dielectric reflecting film formed on the reflector 15, 16, 25 and 26 is particularly suited to the reflecting surface for an optical maser. This is so because the film results in very little light loss and additionally the film may be provided with the desired characteristic such that the reflection occurs only for the light within a very narrow band of wavelength on both sides of an optionally selected specific center wavelength and decreases very rapidly for the light of the wavelengths falling outside of such band.

The gas to be sealed in the optical maser may be any of an inert gas, such as helium, neon, argon, krypton, and xenon, and any mixture of such gases. The gas may include oxygen in addition.

In order to prevent escape of the sealed gas, a separate glass envelope may be used in addition to the anode, the cathode, and the ceramic inter-connecting ring. In this case, it is desirable, in order to prevent deterioration of the optical characteristics of the reflectors or the flat plates, to use either the reflectors or the flat plates as portions of the envelope or to dispose those portions of the envelope perpendicular to the axis which the light passes through.

While we have described above the principles of our invention in connection with specific embodiments, it is to be clearly understood that this description is made only by way of example, and not as a limitation to the scope of our invention as set forth in the objects thereof and in the accompanying claims.

What is claimed is:
1. An optical maser providing a hollow-type glow discharge comprising:
  (A) a tubular member having:
    (1) a metal tubular cathode portion
    (2) a coaxial tubular anode portion spaced apart from said cathode, the inside diameter of said anode being substantially equal to that of said cathode;
  (B) a gas in said tubular member; the interior surfaces of said tubular cathode and anode portions being exposed to and surrounding said gas;

(C) light transmitting sealing means for confining said gas within said member;

(D) an optical resonant cavity including a light reflector positioned at each end of said tubular member to intercept the axis of said member, at least one of said reflectors having a reflection transmission characteristic such that a fraction of light in a preselected range of wavelengths can be transmitted therethrough;

(E) a source of potential connected to said anode and cathode portions for supplying a voltage difference between said portions sufficient to cause a glow discharge in the gas, said glow discharge producing light having at least some wavelengths in said preselected range.

2. An optical maser as set forth in claim 1 wherein the cathode is formed of a metal which sputters and partially vaporizes in the presence of said glow discharge, the thus vaporized metal being excited by said glow discharge to emit intense light.

3. An optical maser as set forth in claim 2 wherein the cathode is formed of a metal selected from the group consisting of: titanium, zirconium, hafnium, niobium, tantalum, molybdenum, tungsten, iron, nickel, and copper.

4. An optical maser as set forth in claim 2 wherein the gas is at least one gas selected from the group consisting of: helium, neon, argon, krypton, xenon, and oxygen.

5. An optical maser as set forth in claim 2 wherein each of said reflectors is a flat plate formed of an isotropic transparent material and defined by two parallel principal planes, and each has a reflecting surface formed on one of said planes.

6. An optical maser as set forth in claim 2 wherein each of said reflectors is a plano-concave plate formed of an isotropic transparent material and wherein said plate is defined by a plane surface and a concave spherical surface whose radius of curvature is substantially equal to the distance between said reflectors, and wherein a reflecting surface is formed on said concave spherical surface.

7. An optical maser as set forth in claim 5 wherein said reflecting surface is a multi-layer dielectric reflecting film having a transmission-reflection characteristic such that only between 0.2% and 5.0% of the light within a narrow wavelength range about a selected wavelength is transmitted therethrough while the remaining part of said light is substantially wholly reflected and wherein said film has a transmission reflection characteristic such that the reflections rapidly decreases for emitted light outside said predetermined range.

8. An optical maser as set forth in claim 6 wherein said reflecting surface is a multi-layer dielectric reflecting film having a transmission-reflection characteristic such that only between 0.2% and 5.0% of the light within a narrow wavelength range about a selected wavelength is transmitted therethrough while the remaining part of said light is substantially wholly reflected and wherein said film has a transmission-reflection characteristic such that the reflections decrease rapidly for emitted light outside of said narrow range.

9. An optical maser as set forth in claim 2 wherein the pair of reflectors are respectively positioned in spaced relation from the opposite sealed ends of said tubular member, and wherein the sealing means includes a flat plate at each end of said tubular member, each of said plates having a pair of principal parallel planes and being formed of an isotropic transparent material, each of said flat plates further being positioned to intersect the axis of said tubular member and wherein the angle A formed between the normal to said flat planes and said axis is defined by the equation:

$$\tan A = n$$

where $n$ is the refractive index of said isotropic material.

10. An optical maser as set forth in claim 9 wherein said isotropic transparent material is selected from the group consisting of: plastic, glass, and fused quartz.

11. An optical maser as set forth in claim 2 wherein said transparent sealing means is formed of a material selected from the group consisting of: plastic, glass and fused quartz.

References Cited

UNITED STATES PATENTS

| | | | |
|---|---|---|---|
| 3,144,617 | 8/1964 | Kogelnik et al. | 331—94.5 |
| 3,149,290 | 9/1964 | Bennett, et al. | 331—94.5 |
| 3,242,439 | 3/1966 | Rigden et al. | 331—94.5 |

JEWELL H. PEDERSEN, Primary Examiner

WILLIAM L. SIKES, Assistant Examiner

U.S. Cl. X.R.

313—204, 217